Aug. 29, 1967  L. MARCOUX  3,338,476
HEATING DEVICE FOR USE WITH AEROSOL CONTAINERS
Filed Oct. 24, 1965  3 Sheets-Sheet 1

INVENTOR,
LEO MARCOUX,
BY
ATT'Y.

INVENTOR,
LEO MARCOUX,
BY
ATT'Y.

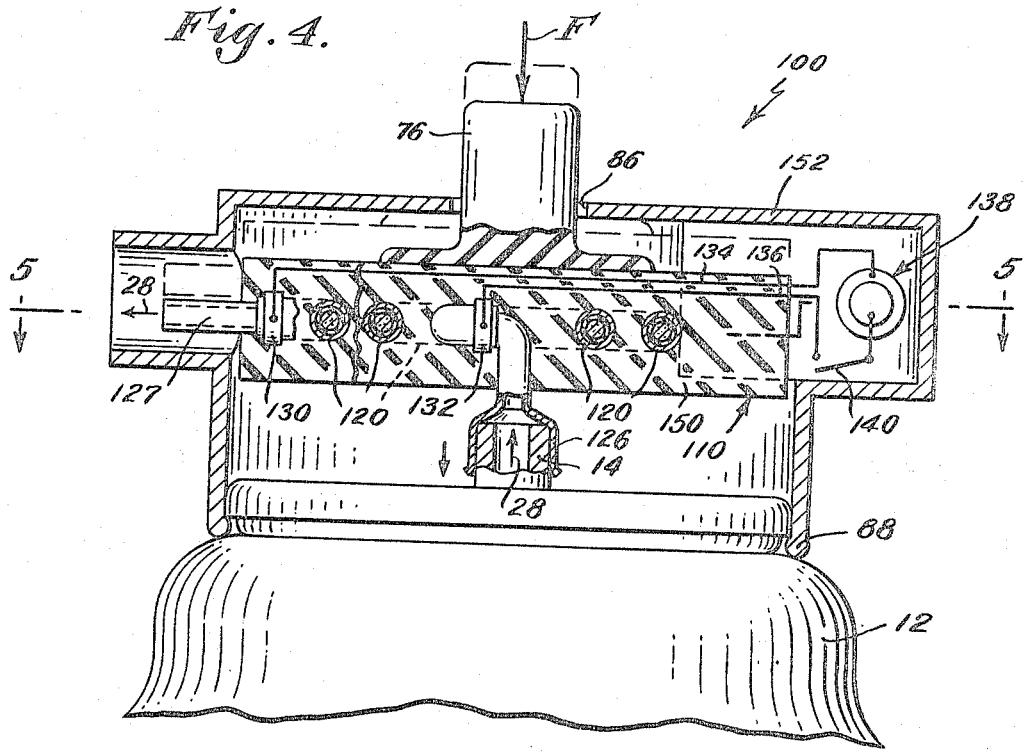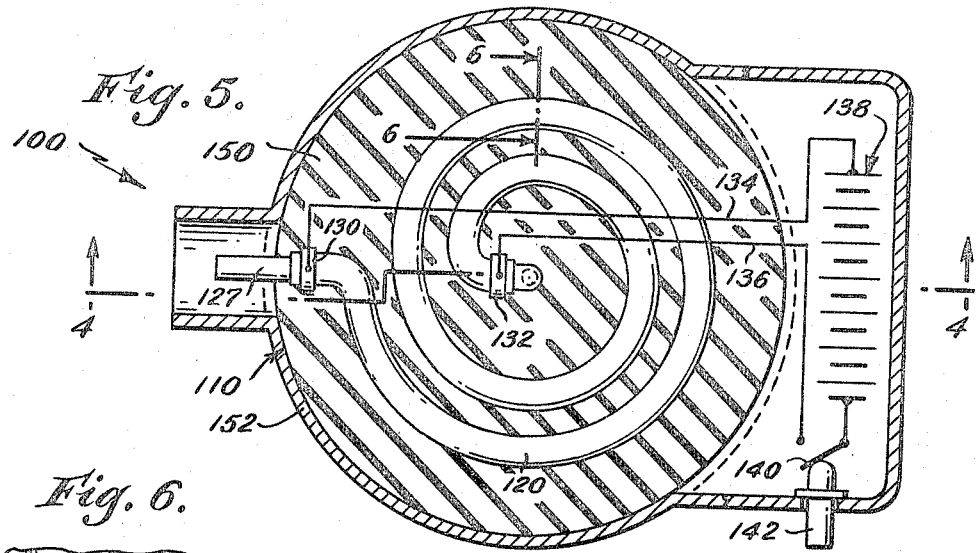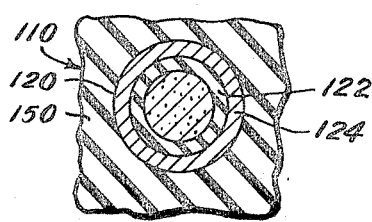

United States Patent Office 3,338,476
Patented Aug. 29, 1967

3,338,476
HEATING DEVICE FOR USE WITH AEROSOL CONTAINERS
Leo Marcoux, Pawtucket, R.I., assignor to Texas Instruments Incorporated, Dallas, Tex., a corporation of Delaware
Filed Oct. 24, 1965, Ser. No. 504,944
12 Claims. (Cl. 222—146)

ABSTRACT OF THE DISCLOSURE

A heater-dispenser device for heating fluid materials passing therethrough is disclosed in which improved heating means is employed. The heating means comprises a solid state heater element having a temperature-resistivity curve which reflects low resistance values at relatively low temperatures with relatively small changes in resistance with increasing temperature until an anomaly point is reached at which point the resistance rapidly increases with slight temperature rise so that the heater element not only generates heat but also controls the amount of heat generated by effecting a thermal equilibrium at approximately the anomaly temperature. In one embodiment the heating element is in close thermal juxtaposition to the heat exchanger while in another embodiment the heat exchanger, heater and dispenser are formed integrally.

---

This invention relates to an improved heating device for use with containers. More particularly, it relates to an improved device which can heat up a fluid medium issuing from a pressurized package.

Pressurized containers have become widely used for packaging and dispensing fluids and fluid-like materials. It is desirable to elevate the temperature of many of such materials, such as by way of example, windshield de-iceing fluids for automobiles, certain paints and varnishes, hot fudge and similar food items, shaving cream and so on.

Various prior art devices have been designed for this purpose. Generally they have been of two basic types as exemplified by the United States Patent to Lannert, 2,873,351 issued Feb. 10, 1959. Said patent discloses a heat exchanger which is attachable to the outlet of an aerosol container. Fluid medium is directed through said heat exchanger as it is released from the container and is thereby heated. The heat exchanger is heated by an electric heater in one embodiment and by hot water in another embodiment. My invention pertains to an improvement on the first-mentioned embodiment.

Aerosol containers employ a gas, such as Freon, under pressure to force the contents thereof out of the container when the discharge valve is opened. Since the containers are fabricated from relatively thin gauge materials it is important to keep the gas pressure at a safe level. Safe maximum temperatures, e.g. 120° F., have been determined for such containers since elevating the temperature of a gas in a constant volume increases the pressure thereof. Heaters used with aerosol containers, to be safe, must not cause the temperature of the container to approach these levels.

Electric heaters in prior art devices have had certain inherent limitations, to name a few, they have necessitated relatively complex, expensive constructions in order to provide for adequate safety and to keep the heating device in the environs of a desired temperature by turning on and off the heating element current by use of movable contacts. They have drawn relatively large amounts of power, line voltage variations have caused variations in heater temperature and extra parts have been required to calibrate the heaters and regulate the temperature thereof.

It is therefore an object of this invention to overcome the disadvantages mentioned supra and to provide a simple, inexpensive, reliable, sturdy, heating device which is easy to fabricate and useful with aerosol containers.

It is another object of this invention to provide a heating device useful with aerosol containers which results in minimal heat transfer to the container.

Another object is to provide an aerosol dispenser-heater the temperature of which is self-regulating and insensitive to normal line voltage fluctuations.

It is yet another object to provide a dispenser-heater which has a short warmup time.

Another object of the invention is the provision of an aerosol dispenser-heater which is removably attachable to the outlet of a pressurized container to heat the contents as they issue therefrom.

Briefly, my invention employs a solid state heating element, the temperature of which is self-regulating, and mounting the heater so that the fluid or fluid-like medium which issues from the aerosol container when the valve thereof is in the active or open position is heated while issuing therefrom.

The invention accordingly comprises the elements and combinations of elements, features of construction, and arrangements of parts which will be exemplified in the structures hereinafter described, and the scope of the application of which will be indicated in the appended claims.

In the accompanying drawings, in which two of the various possible embodiments of the invention are illustrated:

FIG. 4 is a cross sectional view similar to FIG. 1 of a second embodiment of the invention;

FIG. 5 is a cross sectional view taken along line 5—5 of FIG. 4; and

FIG. 6 is a cross sectional view of the heating element taken on line 6—6 of FIG. 5.

Similar reference characters indicate corresponding parts throughout the several views of the drawings.

Figure 1:
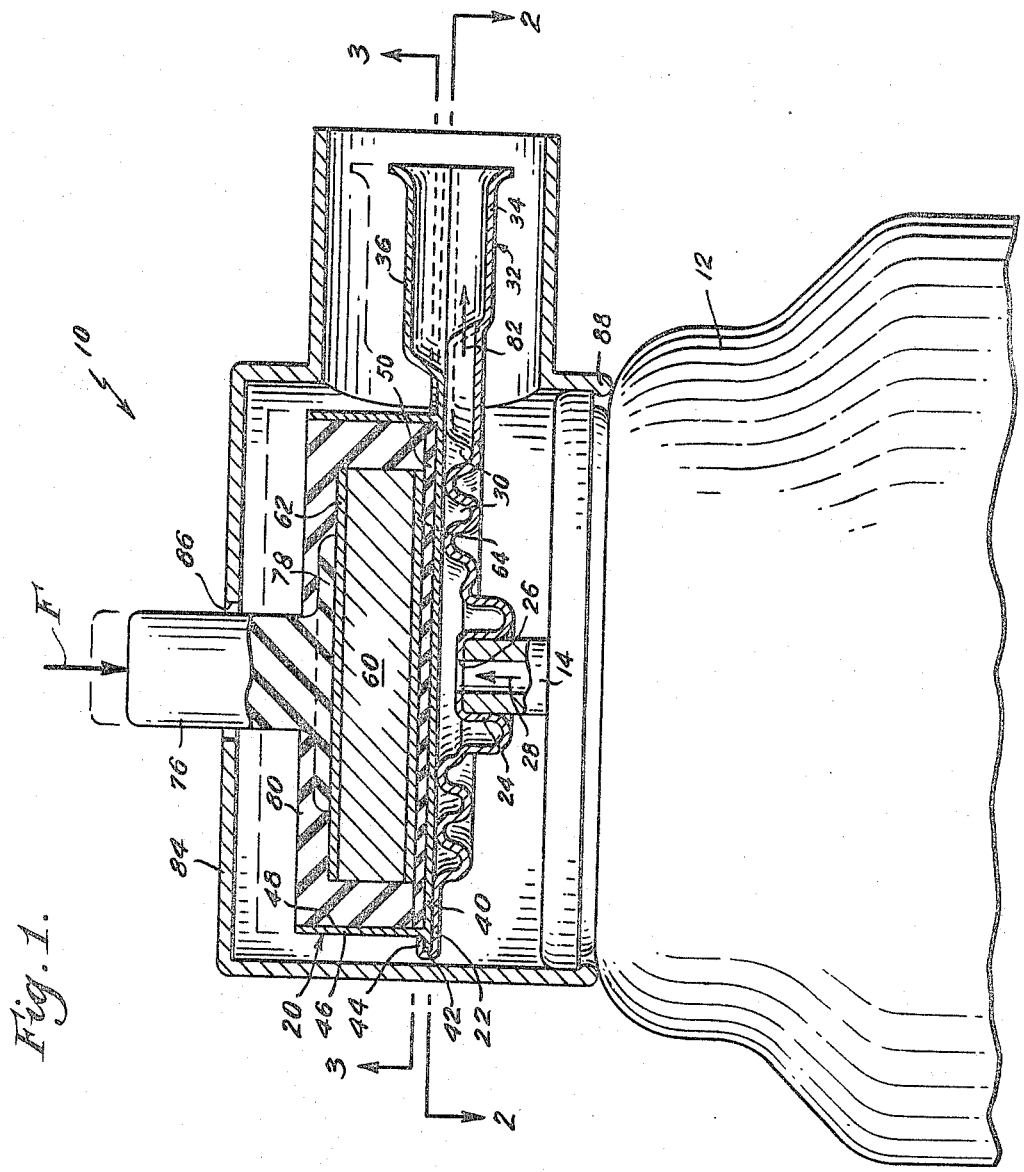
FIG. 1 is a cross sectional side view of one embodiment of the invention, with part of the aerosol container broken away.

Dimensions of certain of the parts as shown in the drawings have been modified and/or exaggerated for the purpose of clarity of illustration.

Figure 2:
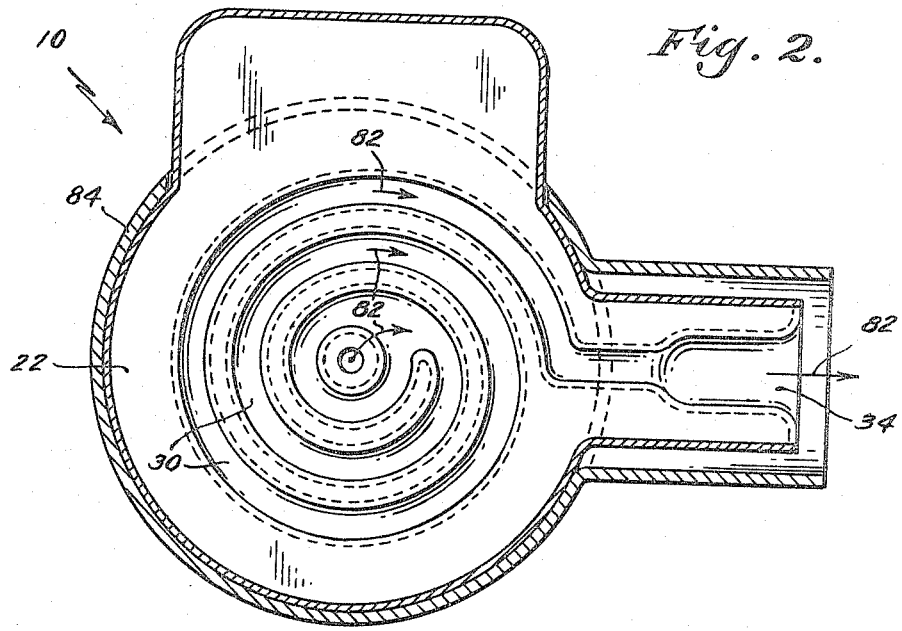
FIG. 2 is a cross sectional view taken along line 2—2 of FIG. 1.
Figure 3:
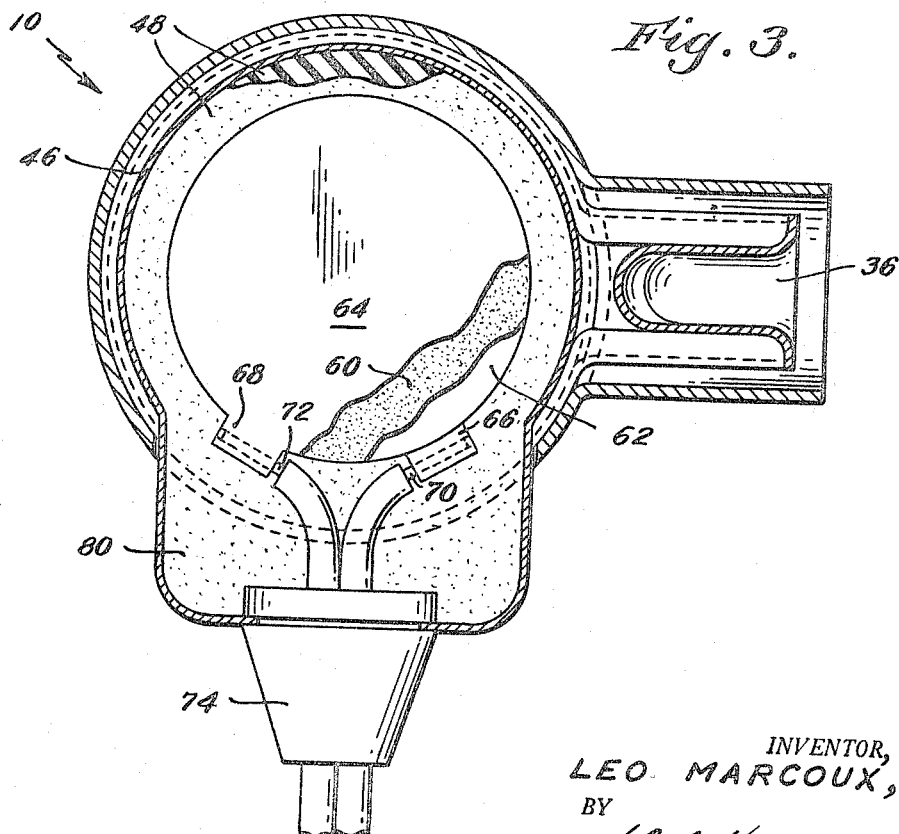
FIG. 3 is a cross sectional view taken along line 3—3 of FIG. 1.

Referring now to the drawings, and in particular to FIGS. 1–3 one embodiment of the invention is shown and designated generally by the reference numeral 10. A standard aerosol can 12 with a tubular discharge port 14 extending from an outlet valve mounts a heater-dispenser assembly 20. Assembly 20 is composed of spiral-shaped base plate 22 having a central seating portion 24 shaped complementary to port 14 and into which port 14 is inserted. Aperture or ingress 26 is provided in portion 24 and is aligned with the bore in port 14 to permit passage of aerosol material therethrough as indicated by arrow 28. Base plate 22 is formed with spiral groove 30, best seen in FIG. 2, which provides communication between port 14 and spout or egress 32. A cover plate 40 is located in overlying relation to base plate 22 and encloses groove 30 to complete the spiral passageway. It will be seen that spout 32 is formed by portion 34 of base plate 22 and portion 36 of cover plate 40. Cover plate 40, of a good thermally conductive material, is formed with a flange 42 about which base plate 22 is crimped as indicated at 44. Cover member 40 is formed with upstanding wall 46 extending therefrom which forms a cavity 48. A thin layer of an electrically insulating material 50, such as polyethylene terephthalate resin, is placed on the bottom surface of plate 40. This layer is preferably thin to keep thermal conductivity at an optimum.

A piece of solid state PTC material, further defined infra, element 60, is located in close thermal contact with insulating layer 50 and cover 40. Upper and lower terminals, 62 and 64 respectively, are provided on opposite sides of element 60 and are attached in a conventional manner, as by soldering to an electrically conductive solder layer applied to said opposite sides. Tab portions 66 and 68 are provided on terminals 62 and 64 respectively and are crimped around wires 70, 72 of plug 74 as best seen in FIG. 3. Button 76 is placed on upper terminal 62 and electrically insulating potting material 80 encapsulates element 60 and base 78 of button 76.

The electrical circuit may be traced from wire 70 of plug 74 to terminal 62 via tab 66, through element 60 to terminal 64 and finally to wire 72 of plug 74 via tab 68.

Activation of the circuit is effected by connecting the opposite end of the cord composed of wires 70, 72 (the end which is not shown in the drawings) to normal house current. If it is deemed desirable a standard on-off switch may be incorporated into this cord.

Heater-dispenser assembly 20 is shown in the active or open position in solid lines which results when a force F acts on button 76. The inactive or closed position is indicated in phantom lines. When force F is exerted, aerosol material issues under pressure from can 12 through port 14, as indicated by arrows 82 in FIG. 2. Cap grooves 30, as indicated by arrows 82 in FIG. 2. Cap member 84 is placed over assembly 20 and is provided with aperture 86 for reception of button 76 therethrough and is retained on can 12 by rib portion 88.

Element 60 may be composed of any material which has as a characteristic a large positive temperature coefficient of resistance (PTC), that is, material in which the percent change in resistance per degree change in temperature in the so-called break or anomaly point is very large. Polymers which can be cross-linked with carbon or other elements such as carbon black filled cross-linked polyethylene, e.g. No. 4510 obtainable from Cabot Corporation, 125 High Street, Boston, Massachusetts, are examples of one type of material. Another class of material is certain doped ceramics such as barium titanate doped with lanthanum, $Ba_{.997}La_{.003}TiO_3$.

As an example, one self-regulating heater element 60 was made using $Ba_{.997}La_{.003}TiO_3$ as follows.

The raw materials used were reagent grades of barium carbonte ($BaCO_3$), lanthanum carbonate $La_2(CO_3)_3$; $5H_2O$ and titanium dioxide ($TiO_2$). These were weighed out to an accuracy of about ±.25% to form stoichiometric mixtures, plus 0.1 mole percent excess $TiO_2$ in order to assure the formation of a liquid phase during final firing. These materials were mixed and a sufficient amount of distilled water was added to form a 20% solid mixture by weight. This mixture was ball milled and dried. The dried product was powdered and calcined in order to convert the material into the desired doped compound ($Ba_{.997}La_{.003}TiO_3$) by firing at approximately 1100° C. in air and cooled. The material, in the form of a porous cake, similar in texture and appearance to soft black-board chalk, was broken up and wet milled as above, dried comminuted and sieved from ±40 to —270 (U.S. standard Sieves). The resulting powder was again immediately dried to drive off any moisture which might have been absorbed during comminution and sieving and finally pressed into the desired cylindrical shape using conventional closed die ceramic-pressing techniques on a hydraulic press. The resulting compacted powder body was fired to the ceramic state at about 1500° C. Further details regarding the preparation of similar PTC material may be found in copending application, filed Apr. 13, 1964, Ser. No. 359,370, assigned to the assignee of the instant invention.

A second embodiment is shown in FIGS. 4–6 and indicated generally at 100. Aerosol can 12 is employed with port 14 as in the first described embodiment. In this embodiment the heat exchanger is formed integrally and as a part of the dispenser and heater. This heater-dispenser assembly is indicated at 110. A tube 120 of an extrudable PTC material, such as carbon-filled cross-linked polyethylene referred to supra, is employed. As seen in FIG. 6 tube 120 is composed of an inner electrical insulating sleeve 122 of polyethylene and an outer sleeve 124 of PTC material. Clips 130 and 132 are attached, as by crimping to sleeve 124. An electrical conductor 134 connects clip 130 to one side of battery 138 and conductor 136 electrically connects clip 132 to the other side of battery 138. Switch 140 connected to conductor 136 and button 142 is used to open and close the circuit. Tube 120 is preferably formed in a spiral and has ingress end 126 which is enlarged and formed only of electrically insulating sleeve 122 and in which is telescopically received port 14. Egress 127 of tube 120 is the dispenser end and may be flared if desired. End 127 is also formed of inner sleeve 122. Electrically insulating material 150, such as polyethylene, is molded around tube 120 and forms a cylindrical slab to which button 76 is attached. Cap 152 is placed over heater-dispenser assembly 110 and is provided with aperture 86 for reception of button 76 as in the FIGS. 1–3 embodiment.

As in the FIGS. 1–3 embodiment, the device is shown in solid lines in the active or open position whereby force F biases port 14 downwardly opening the aerosol can valve and permitting aerosol material to issue under pressure through the tube as indicated by arrows 28. The inactive or closed position is indicated by phantom lines.

PTC materials useful in accordance with my invention, are steep sloped materials having a low resistance in the cold state. Initially, when power is applied through the heating circuit relatively large currents are drawn and consequently high power and heat are dissipated. The resistance stays at a relatively low level as the temperature increases until an anomaly point is reached at which point the resistance rapidly increases with slight temperature rise. At the anomaly point an increase in temperature is accompanied by a proportionally much greater increase in resistivity. Concomitant with this increase in resistivity is a decrease in power showing that current level drops as the resistance increases thereby limiting the quantity of heat generated. As a result the heat generated always tends to balance the heat dissipated. If the heat demand is increased, the temperature of the PTC material tends to be reduced causing a drop in resistance. This results in a conomitant increase in current and hence increased generated power until once again the heat generated equals the heat dissipated with very little change in temperature.

The use of the PTC heating element provides an automatically controlled electrical heat input to the heat exchanger. At normal room temperature, the element resistance is low. Application of line voltage to the element will cause a substantial current flow with concomitant heat generation in the heating element. When the element temperature reaches the temperature-resistance anomaly wherein the resistance increases very rapidly with temperature, current will be reduced by the increasing resistance to the point that termal equilibrium will result at approximately the anomaly temperature.

A heating device constructed in accordance with my invention has a rapid warmup time, in the order of 30 seconds from room ambient employing a heating element designed to draw 200 watts from a cold start. It will then cut itself back to about 4 watts of standby power. If the device is left connected to a source of power it will regulate its own temperature using only the low standby power.

As the aerosol container contents issues forth and draws heat from said element tending to cool the element, this will be countered by an increase of power until it finally heats itself to equilibrium point.

Another advantage of my invention is that voltage variations have very little effect on performance. Typical line variations range from 95 to 135 volts and will effect the warmup-time slightly but has nearly no effect on the equilibrium temperature. The PTC element acts as a power regulator at the anomaly point, a voltage drop resulting in a current increase and vise versa.

It will be seen that yet another advantage offered by my invention is that the device itself has no moving parts, no calibration is required, it is easy to seal and has long life.

The PTC heater element provides extremely rapid warmup time because of the high initial heat input and followed very quickly by a reduction in heat input, when equilibrium temperature is attained, to standby power. On a device constructed in accordance with this invention with 115 volts applied to the element the initial input was 200 watts. This stabilized at about 220° F. and reduced heat demand to 4 watts. Even after hours of continuous activation the top of the pressurized container was barely warm to the touch.

In the embodiments using line house current it is within the purview of the invention to use a step-down transformer in the line cord so that any electric grounding or short circuiting of the heating element or other electrical parts would not be dangerous.

Alternatively a detachable power cord could be used together with a mechanical interlock which would require detachment of the power cord prior to use of the dispenser. Thus the heat stored in the element and heat exchanger would heat the issuing contents of the container.

In view of the above it will be seen that the several objects of the invention are achieved and other advantageous results attained.

It is to be understood that the invention is not limited in its application to the details of construction and arrangement of parts illustrated in the accompanying drawings, since the inventions capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

What is claimed is:

1. A heater-dispenser device usable with aerosol containers comprising:
    (a) a support with a passageway formed therein; said passageway having an ingress and an egress;
    (b) a solid state heater element having a steep slope PTC temperature-resistivity curve in close thermal connection to said passageway and mounted by said support; and
    (c) terminal means electrically connected to spaced portions of said heater element,
        said ingress adapted to communicate with the outlet port of said aerosol container whereby a voltage applied to said terminal causes the heater element to generate heat and approach a thermal equilibrium with heat loss thereby heating a fluid medium passing through said passageway.

2. A device according to claim 1 in which the heater element is composed of $Ba_{.997} La_{.003} TiO_3$.

3. A device according to claim 1 in which the heater and the support defining the passageway are formed integrally.

4. A device according to claim 1 in which the PTC element is in the form of a tube, and said terminals are attached to opposite ends of said tube.

5. A device according to claim 4 in which the PTC element is composed of carbon black filled cross-linked polyethylene.

6. A device according to claim 3 further including a battery source electrically connected to said terminals.

7. A device according to claim 4 in which the tube is coiled into a spiral, said support consisting of an electrical insulating encapsulation, a sleeve of electrical insulating material located within said tube and extending axially beyond said PTC material, said egress serving as a nozzle, said ingress flared to receive therein the tubular discharge port of said aerosol container.

8. A device according to claim 7 further including manually operable means to move said device and said port to an active position whereby the contents of said container are released into said passageway.

9. A device according to claim 1 in which said support member is formed with a spiral-shaped groove, and further comprising:
    (d) a cover plate of thermally conductive material overlying said grooves forming an internal passageway therethrough with an egress and an ingress, said heater element mounted in said cover plate in close thermal relation thereto; and
    (e) terminals electrically connected to spaced portions of said heater element.

10. A device according to claim 1 in which said heater element and terminal means are disc shaped, said terminals sandwiching said heater element therebetween forming a heater assembly, and said cover member formed with upstanding wall portions defining a cavity, said element and terminal mounted on said cover member in said cavity, and electrically and thermally insulating potting compound infilled over said heater assembly and between said assembly and said wall portion.

11. A heater-dispenser device usable with aerosol containers comprising:
    (a) a support member having a spiral-shaped groove;
    (b) a cover plate of thermally conductive material overlying said support member and enclosing said grooves forming an internal passageway therewith with an egress and an ingress;
    (c) a solid state heating element composed of PTC material having a steep slope temperature-resistivity curve supported on said cover plate in close thermal connection therewith;
    (d) terminals electrically connected to two opposite faces of said element;
    (e) electrical insulation interposed between said PTC element and said cover plate;
    (f) said support member adapted to fit over a discharge port of an aerosol container with said ingress in communication with said port; and
    (g) manually operable means to move said device and said port to an active position whereby the contents of said container is forced through said passageway and through said ingress and is heated by said element when voltage is applied to said terminal, said voltage causing said PTC element to generate heat and approach a thermal equilibrium with heat loss.

12. A heater-dispenser device comprising:
    (a) a solid state heater element having a resistivity, temperature curve characterized by a portion of the curve having a relatively low resistance value, an anomaly point and a further portion displaying a positive temperature coefficient of resistance and a relatively steep slope;
    (b) a support having an internal passageway therein, said support mounting said heater element in close thermal relation; and
    (c) terminal means electrically connected to spaced portions of said heater element whereby a voltage applied to said terminal causes the heater element to generate heat and approach a thermal equilibrium with heat loss while maintaining an essentially constant temperature.

References Cited

UNITED STATES PATENTS

| | | | |
|---|---|---|---|
| 1,654,551 | 1/1928 | Muhleisen | 219—301 |
| 2,873,351 | 2/1959 | Lannert | 219—214 |
| 2,914,221 | 11/1959 | Rosenthal | 222—146 |
| 2,962,575 | 11/1960 | Baker | 219—504 X |
| 3,032,635 | 5/1962 | Kraft | 222—146 X |
| 3,067,311 | 12/1962 | Lacy-Hulbert | 219—504 X |
| 3,069,528 | 12/1962 | Gardner | 219—214 |
| 3,116,403 | 12/1963 | Carter | 222—146 X |
| 3,134,191 | 5/1964 | Davis | 222—146 X |
| 3,215,818 | 11/1965 | Deaton. | |

FOREIGN PATENTS 1,284,419  1/1962  France.

RAPHAEL M. LUPO, *Primary Examiner.*